US012696236B2

(12) United States Patent
Xu

(10) Patent No.: US 12,696,236 B2
(45) Date of Patent: Jul. 28, 2026

(54) PAGING INDICATING METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 341 days.

(21) Appl. No.: 18/204,860

(22) Filed: Jun. 1, 2023

(65) Prior Publication Data

US 2023/0309060 A1 Sep. 28, 2023

Related U.S. Application Data

(63) Continuation of application No. PCT/CN2020/133914, filed on Dec. 4, 2020.

(51) Int. Cl.
*H04W 68/02* (2009.01)

(52) U.S. Cl.
CPC .................................. *H04W 68/02* (2013.01)

(58) Field of Classification Search
CPC ...................................................... H04W 68/02
USPC ........................................................ 455/458
See application file for complete search history.

(56) References Cited

U.S. PATENT DOCUMENTS

| | | | | |
|---|---|---|---|---|
| 2006/0128433 A1* | 6/2006 | Liang | .................. | H04W 68/025 |
| | | | | 455/560 |
| 2012/0122495 A1* | 5/2012 | Weng | .................. | H04W 68/025 |
| | | | | 455/458 |
| 2017/0142560 A1 | 5/2017 | Ryu et al. | | |
| 2018/0077680 A1* | 3/2018 | Tenny | .................. | H04W 16/28 |
| 2018/0270790 A1* | 9/2018 | Shi | ...................... | H04W 68/005 |
| 2020/0367194 A1 | 11/2020 | Berggren et al. | | |
| 2022/0046582 A1* | 2/2022 | Shrivastava | .......... | H04W 68/02 |
| 2022/0046585 A1* | 2/2022 | Wu | ........................ | H04L 5/0053 |
| 2022/0124674 A1* | 4/2022 | Babaei | .................. | H04W 68/02 |

(Continued)

FOREIGN PATENT DOCUMENTS

| | | |
|---|---|---|
| CN | 109286966 A | 1/2019 |
| CN | 109392090 A | 2/2019 |

(Continued)

OTHER PUBLICATIONS

Extended European Search Report dated Dec. 5, 2023 received in European Patent Application No. EP20963999.6.

(Continued)

*Primary Examiner* — Mark G. Pannell
(74) *Attorney, Agent, or Firm* — Sheppard, Mullin, Richter & Hampton LLP

(57) ABSTRACT

The embodiments of the present disclosure provide a paging indicating method, a terminal device, and a network device, capable of avoiding monitoring a paging message at a paging occasion when a terminal device does not need to receive the paging message, thereby achieving power saving of the terminal. The paging indicating method includes: receiving, by a terminal device, indication information corresponding to at least one terminal group and indicating whether terminals in the corresponding terminal group monitor a paging message.

20 Claims, 5 Drawing Sheets

200

(56)          References Cited

U.S. PATENT DOCUMENTS

| | | | | |
|---|---|---|---|---|
| 2022/0132464 | A1* | 4/2022 | Agiwal | H04W 24/08 |
| 2022/0167270 | A1* | 5/2022 | Ye | H04W 68/02 |
| 2023/0015708 | A1* | 1/2023 | Gurumoorthy | H04W 68/025 |
| 2023/0032154 | A1* | 2/2023 | Hwang | H04W 76/20 |
| 2023/0108646 | A1* | 4/2023 | Tseng | H04W 68/025 |
| | | | | 455/458 |
| 2023/0276362 | A1* | 8/2023 | Reial | H04W 56/0015 |
| | | | | 370/311 |
| 2023/0292326 | A1* | 9/2023 | Jung | H04L 5/0053 |
| 2023/0388927 | A1* | 11/2023 | Yang | H04W 68/02 |
| 2023/0397115 | A1* | 12/2023 | Maleki | H04W 52/0235 |

FOREIGN PATENT DOCUMENTS

| | | | |
|---|---|---|---|
| CN | 109803355 | A | 5/2019 |
| EP | 3657864 | A1 | 5/2020 |
| EP | 4258767 | A1 | 10/2023 |
| WO | 2019024698 | A1 | 2/2019 |

OTHER PUBLICATIONS

Ericsson: "Discussion on potential paging enhancements for UE power savings", 3GPP Draft; R1-2009200, 3rd Generation Partnership Project (3GPP), Mobile Competence, Centre; 650, Route Des Lucioles; F-06921 Sophia-Antipolis Cedex) France, vol. RAN WG1, No. e-Meeting; Oct. 26, 2020-Nov. 13, 2020, Oct. 24, 2020 (Oct. 24, 2020), XP051946891.

International Search Report and Written Opinion dated Aug. 26, 2021 in International Application No. PCT/CN2020/133914. English translation attached.

CMCC."Discussion on paging enhancement", 3GPP TSG RAN WG1 #102-e R1-2006221, Aug. 28, 2020 (Aug. 28, 2020), Sections 2-3.

"3rd Generation Partnership Project;Technical Specification Group Radio Access Network;NR;Study on UE Power Saving(Release 16)", 3GPP TR 38.840 V2.0.0, May 1, 2019, section 5.2 p. 35.

Samsung, "Corrections on UE power savings", 3GPP TSG-RAN WG1 Meeting #100bis-e R1-2003177, Apr. 20, 2020, section 10.3 p. 2.

* cited by examiner

100

120          110          120

| SSB1 | PO1 | PO2 | SSB2 | PO3 | PO4 | SSB3 | PO5 | PO6 | SSB4 |

Monitor PDCCH →

←On duration→ ←—Opportunity for DRX—→

←————————DRX Cycle————————→

Power saving signal indicates to monitor
PDCCH0

Power saving signal indicates not to monitor
PDCCH1

Power saving signal indicates not to monitor
PDCCH2

Power saving signal indicates to monitor
PDCCH3

←—— DRX Cycle ——→

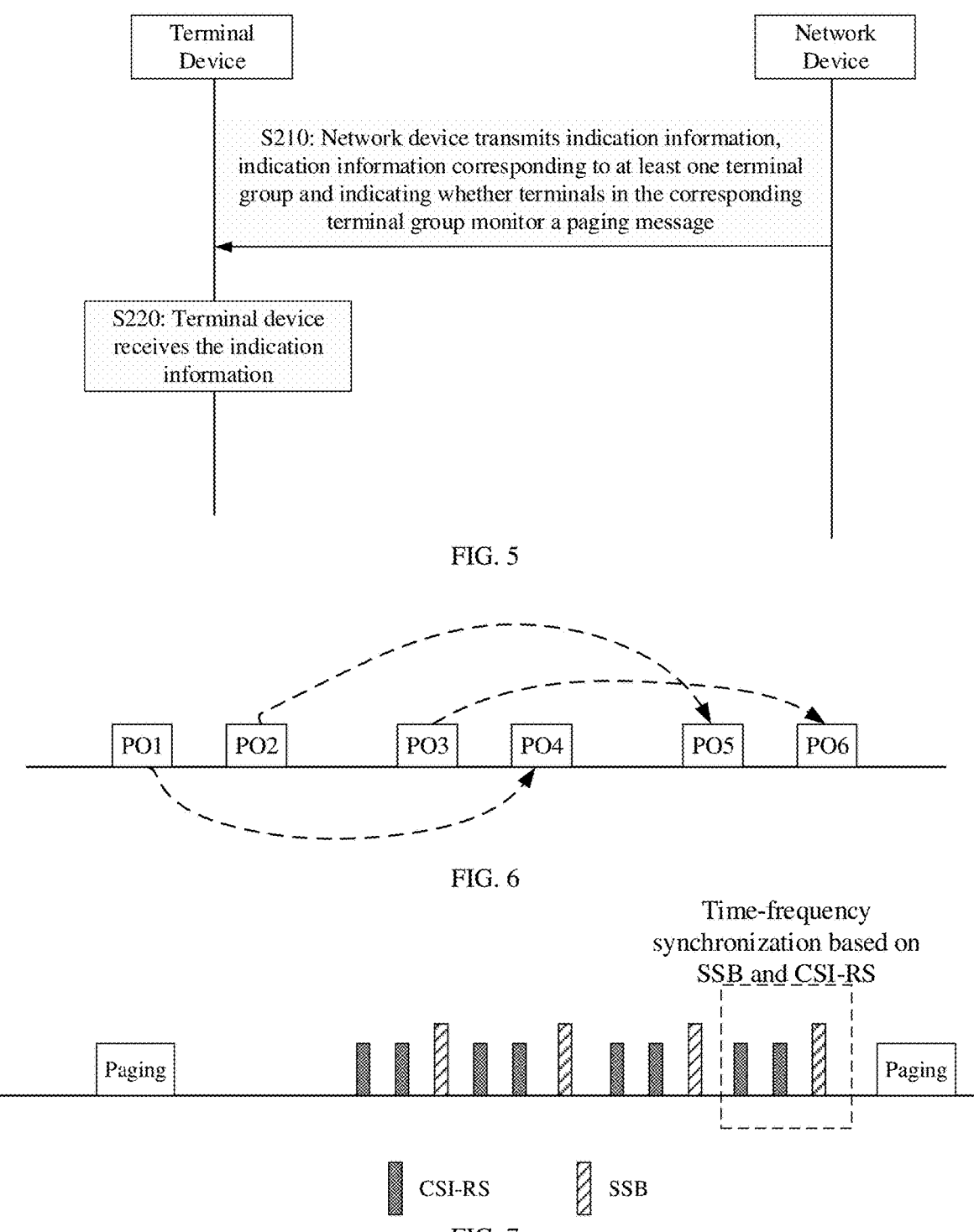

200

Terminal Device

Network Device

S210: Network device transmits indication information, indication information corresponding to at least one terminal group and indicating whether terminals in the corresponding terminal group monitor a paging message S220: Terminal device receives the indication information

Time-frequency synchronization based on SSB and CSI-RS

Paging

Paging

CSI-RS

SSB

FIG. 7

PDCCH1          PDCCH2          PDCCH3          PDCCH4

| PO1 | PO2 | PO3 | PO4 | PO5 | PO6 |

Minimum Time Interval

Minimum Time Interval

PDCCH1          PDCCH2          PDCCH3          PDCCH4

| PO1 | PO2 | PO3 | PO4 | PO5 | PO6 |

Minimum Time Interval

Minimum Time Interval

PDCCH 1-1 | PDCCH 1-2 | PO1 | PO2 | PDCCH 2-1 | PDCCH 2-2 | PO3 | PO4 | PDCCH 3-1 | PDCCH 3-2 | PO5 | PO6 | PDCCH 4-1 | PDCCH 4-2

Minimum Time Interval

PDCCH
Scheduling SIB 1

PEI
information

| PO1 | PO2 | PO3 | PO4 | PO5 | PO6 |

0 1 1 0 1 1 0 1

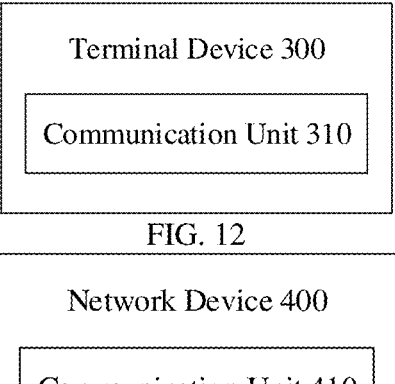
FIG. 12
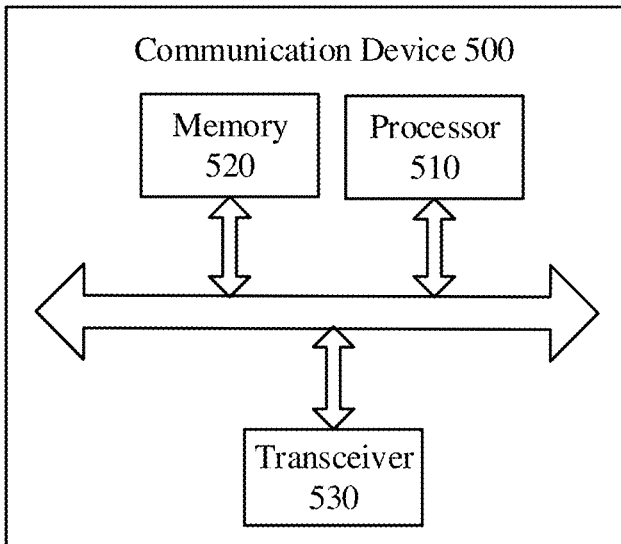
FIG. 13
FIG. 14
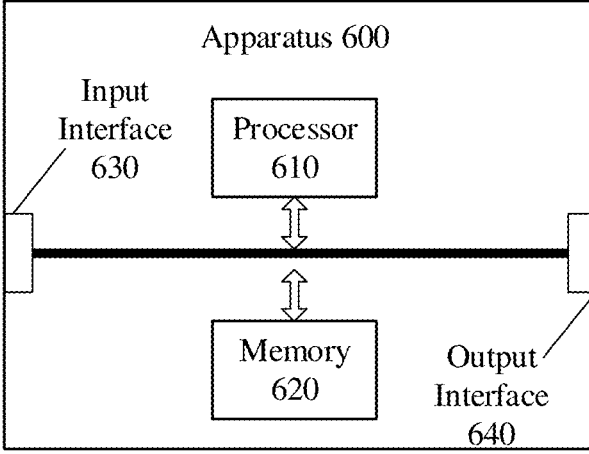
FIG. 15

PAGING INDICATING METHOD, TERMINAL DEVICE AND NETWORK DEVICE

CROSS-REFERENCE TO RELATED APPLICATIONS

This application is a continuation of International Application No. PCT/CN2020/133914 filed on Dec. 4, 2020, the entire disclosure of which is incorporated herein by reference.

TECHNICAL FIELD

The embodiments of the present disclosure relate to communication technology, and more particularly, to a paging indicating method, a terminal device and a network device.

BACKGROUND

When a terminal device is in a Radio Resource Control (RRC) idle state or RRC inactive state, the terminal device needs to continuously monitor a paging message according to a period of the paging message. However, the terminal device only occasionally has traffic and is thus paged, so the terminal device monitors the paging message but most of the time there is no corresponding paging message, which objectively provides room for power consumption optimization. How to avoid monitoring the paging message when there is no paging message for the terminal device is a problem to be solved.

SUMMARY

The embodiment of the present disclosure provides a paging indicating method, a terminal device, and a network device, capable of avoiding monitoring a paging message at paging occasions when a terminal device does not need to receive the paging message, thereby achieving power saving of the terminal.

In a first aspect, a paging indicating method is provided. The method includes: receiving, by a terminal device, indication information corresponding to at least one terminal group and indicating whether terminals in the corresponding terminal group monitor a paging message.

In a second aspect, a paging indicating method is provided. The method includes: transmitting, by a network device, indication information corresponding to at least one terminal group and indicating whether terminals in the corresponding terminal group monitor a paging message.

In a third aspect, a terminal device is provided. The terminal device is configured to perform the method according to the above first aspect.

In particular, the terminal device includes one or more functional modules configured to perform the method according to the above first aspect.

In a fourth aspect, a network device is provided. The network device is configured to perform the method according to the above second aspect.

In particular, the network device includes one or more functional modules configured to perform the method according to the above second aspect.

In a fifth aspect, a terminal device is provided. The terminal device includes a processor and a memory. The memory has a computer program stored thereon, and the processor is configured to invoke and execute the computer program stored in the memory to perform the method according to the above first aspect.

In a sixth aspect, a network device is provided. The network device includes a processor and a memory. The memory has a computer program stored thereon, and the processor is configured to invoke and execute the computer program stored in the memory to perform the method according to the above second aspect.

In a seventh aspect, an apparatus is provided. The apparatus is configured to perform the method according to any of the above first and second aspects.

In particular, the apparatus includes a processor configured to invoke and execute a computer program from a memory, to cause a device provided with the apparatus to perform the method according to any of the above first and second aspects.

In an eighth aspect, a computer-readable storage medium is provided. The computer-readable storage medium stores a computer program that causes a computer to perform the method according to any of the above first and second aspects.

In a ninth aspect, a computer program product is provided. The computer program product includes computer program instructions that cause a computer to perform the method according to any of the above first and second aspects.

In a tenth aspect, a computer program is provided. The computer program, when executed on a computer, causes the computer to perform the method according to any of the above first and second aspects.

With the above technical solutions, the terminal device can determine the terminal group corresponding to the indication information, and determine whether to monitor the paging message based on the indication information. That is, when the terminal device does not need to receive the paging message, it can avoid monitoring the paging message at the paging occasion, thereby achieving power saving of the terminal.

BRIEF DESCRIPTION OF DRAWINGS

FIG. 5 is a schematic flowchart illustrating a paging indicating method according to an embodiment of the present disclosure.

FIG. 6 is a schematic diagram showing a paging PDCCH carrying PEI information according to an embodiment of the present disclosure.

FIG. 7 is a schematic diagram showing time-frequency synchronization based on SSBs and CSI-RSs according to an embodiment of the present disclosure.

FIG. 12 is a schematic block diagram of a terminal device according to an embodiment of the present disclosure.

FIG. 13 is a schematic block diagram of a network device according to an embodiment of the present disclosure.

FIG. 14 is a schematic block diagram of a communication device according to an embodiment of the present disclosure.

FIG. 15 is a schematic block diagram of an apparatus according to an embodiment of the present disclosure.

DESCRIPTION OF EMBODIMENTS

Figures 1, 2, 3, 4:
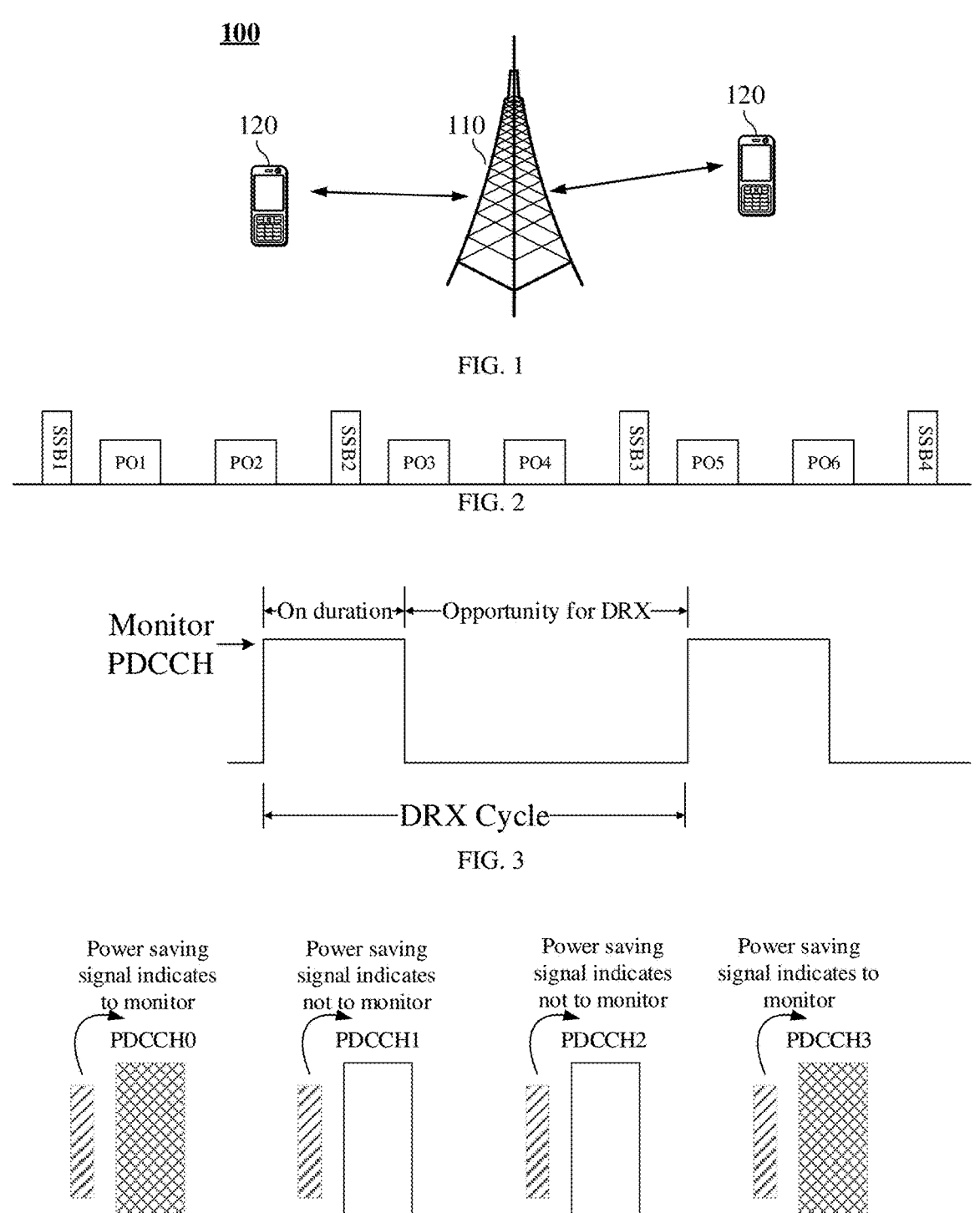
FIG. 1 is a schematic diagram showing a communication system architecture according to an embodiment of the present disclosure.
FIG. 2 is a schematic diagram showing paging occasions and SSBs according to the present disclosure.
FIG. 3 is a schematic diagram showing a DRX according to the present disclosure.
FIG. 4 is a schematic diagram showing a power-saving signal controlling DRX according to the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5th Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to better understand the embodiments of the present disclosure, the NR paging process related to the present disclosure will be described.

Paging messages in NR are periodically transmitted to terminals, and positions at which the paging messages are monitored are Paging Occasion (POs). PO positions of a user is dependent on a user Identity (ID), and the POs of different users are discretely scattered within the paging period, as shown in FIG. 2. When the terminal device is in the RRC idle or RRC inactive state, the terminal device only needs to monitor the paging message in the PO, and the PO typically corresponds to one time slot or several symbols, and thus is relatively short in time. Therefore, if a power-saving signal is transmitted directly before the PO, it simply replaces the paging reception in the PO, and thus may not necessarily bring power-saving gain to the terminal. However, when the terminal device needs to perform time-frequency synchronization based on Synchronization Signal/Physical Broadcast Channel (SS/PBCH) blocks before receiving the paging message, the terminal device generally needs to start the time-frequency synchronization operation several Synchronization Signal Block (SSB) periods in advance before the PO. As shown in FIG. 2, assuming that the paging reception position of the terminal device is the position PO 5 in FIG. 2, in order to perform the synchronization operation, the terminal device may need to receive SSB1, SSB2 and SSB3 before PO5.

To facilitate better understanding of the embodiments of the present disclosure, Discontinuous Reception (DRX) related to the present disclosure will be described.

For power saving of terminals, a DRX transmission mechanism is introduced in LTE. When there is no data transmission, the power consumption can be reduced by stopping receiving the Physical Downlink Control Channel (PDCCH) (blind detection of the PDCCH will be stopped in this case), thereby improving the battery lifetime. The basic mechanism of DRX is to configure a DRX cycle for a terminal device in an RRC connected state. As shown in FIG. 3, the DRX cycle consists of an "On Duration" and an "Opportunity for DRX". In the "On Duration", the terminal device monitors and receives the PDCCH (active period), and in the "Opportunity for DRX" period, the terminal device does not receive the PDCCH to reduce power consumption (sleep period). In addition, the transmission of the paging message is also a DRX mechanism in the RRC idle state, and the DRX cycle in this case is the cycle of the paging message. It can be seen from FIG. 3 that in the time domain, time is divided into successive DRX cycles.

In order to better understand the embodiments of the present disclosure, the terminal power saving mechanism related to the present disclosure will be described.

Since the power consumption in the connected state accounts for the majority of the power consumption of an NR terminal, the NR Release16 (Rel-16) power saving signal is also used for power saving when the terminal is in the RRC connected state.

The traditional terminal power saving mechanism is mainly DRX. When DRX is configured, the terminal monitors the PDCCH during the DRX ON Duration. If the terminal receives data scheduling in the ON Duration, the terminal continues to monitor the PDCCH based on the control of the DRX timer until the data transmission is completed; otherwise, if the terminal does not receive data scheduling in the DRX ON Duration, the terminal enters DRX (discontinuous reception) to achieve power saving. It can be seen that DRX is a power saving control mechanism with the DRX cycle as the time granularity, and therefore cannot achieve optimal power consumption control. For example, even if the terminal has no data scheduling, the terminal still needs to monitor the PDCCH while the DRX ON Duration timer, which is periodically started, is running, and thus there is still power waste.

In order to achieve further power saving of the terminal, NR power saving enhancement introduces a power saving signal, which is used in conjunction with the DRX mechanism. The specific technical principle is that the terminal receives an indication of the power saving signal before the DRX ON Duration. As shown in FIG. 4, when the terminal has data transmission in a DRX cycle, the power saving signal "wakes up" the terminal to monitor the PDCCH in the DRX ON Duration; otherwise, when the terminal has no data transmission in a DRX cycle, the power saving signal does not "wake up" the terminal, and the terminal does not need to monitor PDCCH in the DRX ON Duration. Compared with the existing DRX mechanism, when the terminal has no data transmission, the terminal can omit PDCCH monitoring in the DRX ON Duration, thereby achieving power saving. The time before the DRX ON Duration of the terminal is called inactive time. The time during which the terminal is in the DRX ON Duration is called inactive time.

The power saving technology of Rel-16 is mainly provided for terminals in the RRC connected state, and the power saving optimization is carried out for the DRX mechanism.

However, when the terminal is in the RRC idle or RRC inactive state, the terminal device needs to continuously monitor a paging message according to a period of the paging message. However, the terminal device only occasionally has traffic and is thus paged, so the terminal device monitors the paging message but most of the time there is no corresponding paging message, which objectively provides room for power consumption optimization, i.e., how to avoid monitoring the paging message when there is no paging message for the terminal, so as to achieve power saving.

In view of the above problems, the present disclosure proposes a paging indicating solution, capable of achieving power saving when receiving a paging message.

The technical solutions of the present disclosure will be described in detail below with reference to specific embodiments.

FIG. 5 is a schematic flowchart illustrating a paging indicating method 200 according to an embodiment of the present disclosure. As shown in FIG. 5, the method 200 may include at least a part of the following content.

At S210, a network device transmits indication information, the indication information corresponding to at least one terminal group and indicating whether terminals in the corresponding terminal group monitor a paging message.

At S220, a terminal device receives the indication information.

In an embodiment of the present disclosure, the terminal device may determine the number of terminal groups corresponding to the indication information and the terminal group to which the terminal device belongs according to the indication information, and determine whether to monitor the paging message.

Optionally, the terminal device is in an idle state or an inactive state. Alternatively, the terminal device is in an RRC idle or RRC inactive state.

Optionally, the indication information may be Paging Early Indication (PEI) information. Of course, the indication information may be other types of information, and the present disclosure is not limited to this.

PEI information can be transmitted before the PO position where the terminal device receives the paging message. When the terminal device does not have a paging message, the PEI information indicates that the terminal device does not have a paging message, or instructs the terminal device not to receive a paging message, that is, not to receive a PDCCH scheduling the paging message. On the other hand, when the terminal device needs to receive a paging message, the PEI information indicates that the terminal device has the paging message, or instructs the terminal device to receive the paging message, that is, to receive a PDCCH scheduling the paging message.

In some embodiments, the indication information (such as PEI information) may be carried in Downlink Control Information (DCI).

Optionally, the indication information (such as PEI information) can be carried in an existing DCI format, such as DCI format 1_0 having the DCI's Cyclical Redundancy Check (CRC) scrambled with a System Information Radio Network Temporary Identity (SI-RNTI) and a Paging Radio Network Temporary Identity (P-RNTI), or DCI format 2_6 scrambled with Power Saving Radio Network Temporary Identity (PS-RNTI). Alternatively, the indication information (such as PEI information) may be carried in a special DCI format or PDCCH DCI scrambled with a new RNTI.

Here, the PDCCH having the CRC scrambled with the SI-RNTI is a PDCCH for scheduling system information, e.g., a Physical Downlink Control Channel (PDCCH) for scheduling System Information Block (SIB) 1 or Other System Information (OSI); the PDCCH having the DCI's CRC scrambled with the P-RNTI is a PDCCH for scheduling a paging message; the PDCCH having the DCI's CRC scrambled with the PS-RNTI is a PDCCH introduced in the 3rd Generation Partnership Project (3GPP) Release16 (Rel-16) for carrying power saving indication information.

When the DCI format 1_0 is used, the reserved bits, i.e., unused bits, in the DCI format 1_0 can be used. For example, the reserved bits in the DCI carried by the PDCCH for scheduling the system information or paging message can be used to indicate the PEI information.

In the NR system, the DCI format 1_0 is used to schedule the system information, and the CRC in the DCI format 1_0 is scrambled with the SI-RNTI. In Release15 (Rel-15) and Release16 (Rel-16), there are 15 bits reserved in the DCI format 1_0. That is, the embodiment of the present disclosure can reuse the reserved bits in the DCI format 1_0 for scheduling the system information to carry the PEI information. In other words, the reserved bits in the DCI format 1_0 for scheduling the system information are given a new meaning or purpose of carrying the PEI information.

In some embodiments, the indication information (such as PEI information) may be carried in DCI for scheduling system information. Optionally, the indication information may occupy part or all of the reserved bits in the DCI for scheduling the system information. Here, the reserved bits are not used for scheduling the system information.

Optionally, the system information may include, but not limited to, at least one of: SIB 1, SIB 2, SIB 3, SIB 4, or OSI.

Optionally, in some embodiments, the PDCCH carrying the indication information (such as PEI information) may be a PDCCH for scheduling a paging message, i.e., a PDCCH carrying DCI's CRC check bits scrambled with a P-RNTI. In this case, the indication information (such as PEI information) may be carried in the DCI for scheduling the paging message. For example, the indication information may occupy part or all of the reserved bits in the DCI for scheduling the paging message. Here, the reserved bits are not used for scheduling the paging message.

As an example, a PDCCH for scheduling paging at an earlier PO may be used to indicate the PEI information corresponding to a later PO, and the position relationship between the PO and the PEI information may be predetermined or configured. As shown in FIG. 6, the PDCCH for scheduling the paging message at PO1 carries PEI 1, which indicates whether to monitor the paging message at PO4; the PDCCH for scheduling the paging message at PO2 carries PEI 2, which indicates whether to monitor the paging message at PO5; and the PDCCH for scheduling the paging message at PO3 carries PEI 3, which indicates whether to monitor the paging message at PO6.

Optionally, in some embodiments, the PDCCH carrying the indication information (such as PEI information) may be a specially configured PDCCH dedicated to carrying the indication information. The search space and CORESET for the PDCCH dedicated to carrying the indication information can be configured by a network device via system information or RRC signaling.

Optionally, in some embodiments, a number of terminal groups corresponding to the indication information may be determined according to at least one of:

a period for transmitting the indication information, a number of available bits in the indication information, or a number of paging occasions corresponding to the indication information.

Optionally, the period for transmitting the indication information may be used to determine the number of paging occasions within the period, i.e., it may be used to determine the number of paging occasions corresponding to the indication information, and in turn the number of terminal groups corresponding to the indication information. It should be noted that, the number of paging occasions in each period for transmitting the indication information may be different.

Optionally, when the indication information is carried in DCI, the number of available bits in the indication information may be equal to a number of reserved bits in the DCI, or the number of available bits in the indication information may be equal to a number of bits that are a part of the reserved bits in the DCI, or the number of available bits in the indication information may be equal to a number of reserved bits in the DCI other than a first bit, or the number of available bits in the indication information may be equal to a number of bits that are a part of the reserved bits in the DCI other than the first bit.

Optionally, the part of the reserved bits may be preconfigured or agreed in a protocol, or the part of the reserved bits may be configured by a network device. For example, the number of reserved bits in the DCI may be 15, and the part of the reserved bits may be the first 10 bits of the 15 bits.

Optionally, the first bit may indicate an available reference signal. Here, the available reference signal may be used for time-frequency synchronization and/or Radio Resource Management (RRM) measurement of the terminal device when receiving the paging message.

That is, after obtaining the available reference signal, the terminal device may perform time-frequency synchronization and/or RRM measurement when receiving the paging message based on the available reference signal. Therefore, the efficiency of receiving the paging message can be improved.

Optionally, the available reference signal may include, but not limited to, at least one of: Tracking Reference Signal (TRS) or Channel State Information Reference Signal (CSI-RS).

For example, the available reference signal may be a reference signal configured by the network device for a terminal in the RRC connected state for time-frequency synchronization, and the terminal device in the RRC idle or RRC inactive state can obtain the available reference signal (CSI-RS/TRS) based on the indication information. Before receiving the paging message, the terminal device can not only use SSBs for time-frequency synchronization, but also use the available reference signal, such as CSI-RS/TRS, to achieve time-frequency synchronization. Therefore, the terminal device is expected to use enough reference signals (CSI-RS and/or SSB) to achieve time-frequency synchronization in a relatively short period of time, such that power saving of the terminal device can be achieved.

The network device can transmit CSI-RSs or TRSs to terminal devices in the RRC connected state, and can transmit different CSI-RS signals to different terminal devices. If these CSI-RSs can be used by an NR terminal device in the RRC idle or RRC inactive state, the reference signals available to the NR terminal device in the RRC idle or RRC inactive state can be increased, thereby potentially reducing the time required for the terminal to achieve time-frequency synchronization, allowing power saving of the terminal. For example, as shown in FIG. 7, if the terminal device uses the SSBs for time-frequency synchronization before receiving the paging message, it may also use the reference signal, such as CSI-RS/TRS, to achieve time-frequency synchronization. Therefore, the terminal device is expected to use enough reference signals (CSI-RS and/or SSB) to achieve time-frequency synchronization in a relatively short period of time, such that power saving of the terminal device can be achieved.

Optionally, the available reference signal may include an available reference signal out of a plurality of reference signals, and configuration information for the plurality of reference signals (such as time domain positions of the reference signals) may be configured by a network device via system information or RRC signaling.

For example, the network device configures Reference Signal 1, Reference Signal 2, Reference Signal 3, Reference Signal 4, Reference Signal 5, and Reference Signal 6 via system information or RRC signaling, and the network device indicates the available reference signal via a first bit (which may specifically include 6 bits) in an information field corresponding to the indication information. Here, each of the 6 bits corresponds to a reference signal, and the value of any of the 6 bits being 1 indicates that the corresponding reference signal is available, and the value of 0 indicates that the corresponding reference signal is not available, or vice versa. That is, the network device may use the first bit to indicate the available reference signal from the plurality of reference signals, so as to avoid the signaling overhead caused by directly indicating the available reference signal.

Optionally, a number of bits included in the first bit may be pre-configured or agreed in a protocol, or the number of bits included in the first bit may be configured by a network device, or, the number of bits included in the first bit may be determined based on the configuration information for the plurality of reference signals.

In an optional implementation, the number of terminal groups corresponding to the indication information may be equal to the number of available bits in the indication information. For example, if the number of available bits in the indication information is 10, then the number of terminal groups corresponding to the indication information may be equal to 10.

In an optional implementation, when the indication information corresponds to one paging occasion, the number of terminal groups corresponding to the indication information may be equal to the number of available bits in the indication information.

In an optional implementation, when the indication information corresponds to Q paging occasions, the number of terminal groups corresponding to the indication information is equal to a rounded-down result of the number of available bits in the indication information divided by Q, where Q is a positive integer. For example, if the number of available bits in the indication information is 10, and Q=3, then the number of terminal groups corresponding to the indication information may be equal to 3. In another example, if the number of available bits in the indication information is 10, and Q=4, then the number of terminal groups corresponding to the indication information may be equal to 2.

In an optional implementation, when the indication information corresponds to Q paging occasions, the number of terminal groups corresponding to the indication information is equal to a result of the number of available bits in the indication information divided by Q, where Q is a positive integer. For example, if the number of available bits in the indication information is 10, and Q=2, then the number of terminal groups corresponding to the indication information may be equal to 5. For another example, if the number of available bits in the indication information is 15, and Q=5, then the number of terminal groups corresponding to the indication information may be equal to 3.

Optionally, a correspondence between the PDCCH (having DCI carrying PEI information) and the paging occasion indicated by the indication information may include at least one of: a time interval or minimum time interval between the PDCCH monitoring occasion and the paging occasion indicated by the indication information; or a number of paging occasions corresponding to the PDCCH.

Optionally, the time interval or minimum time interval between the PDCCH monitoring occasion and the paging occasion indicated by the indication information may include one of:

a time interval or minimum time interval between the PDCCH monitoring occasion and the paging occasion indicated by the indication information;

a time interval or minimum time interval between the PDCCH monitoring occasion and the first paging occasion indicated by the indication information;

a time interval or minimum time interval between the PDCCH monitoring occasion and a radio frame where the paging occasion indicated by the indication information is located; or a time interval or minimum time interval between a radio frame where the PDCCH is located and a radio frame where the paging occasion indicated by the indication information is located.

It should be noted that the time interval or minimum time interval between the PDCCH monitoring occasion and the paging occasion indicated by the indication information may specifically be: a time interval or minimum time interval between the start symbol or end symbol of the PDCCH monitoring occasion and the start time or start position of the paging occasion indicated by the indication information. The time interval or minimum time interval between the PDCCH monitoring occasion and the first paging occasion indicated by the indication information may specifically be: a time interval or minimum time interval between the start symbol or end symbol of the PDCCH monitoring occasion and the start time or start position of the first paging occasion indicated by the indication information. The time interval or minimum time interval the PDCCH monitoring occasion and the radio frame where the paging occasion indicated by the indication information is located may specifically be: a time interval or minimum time interval between the start symbol or end symbol of the PDCCH monitoring occasion and the radio frame where the paging occasion indicated by the indication information is located.

For example, the indication information may indicate one paging occasion. In this case, the time interval between the PDCCH monitoring occasion and the paging occasion indicated by the indication information may specifically refer to: a time interval between the PDCCH monitoring occasion and the one paging occasion indicated by the indication information. Specifically, the terminal device can obtain a time point t as a time point that is the time interval earlier than the start time position of the paging occasion (PO), and the PDCCH (carrying the PEI information of the terminal device) monitoring occasion should be the last PDCCH monitoring occasion before the time point t.

In another example, the indication information may indicate a plurality of paging occasions. In this case, the time interval between the PDCCH monitoring occasion and the paging occasion indicated by the indication information may specifically refer to: a time interval between the PDCCH monitoring occasion and the first paging occasion indicated by the indication information. In this case, other corresponding paging occasions may be determined according to the number of paging occasions corresponding to the PDCCH carrying the indication information. For example, the interval between PDCCH 1 carrying the PEI information and the indicated first PO is 20 ms, and if the corresponding number of POs is 2, PO3 and PO4 will be 20 ms later as indicated.

Specifically, the terminal device can obtain a time point t as a time point that is the time interval earlier than the start time position of the first PO, and the PDCCH (carrying the PEI information of the terminal device) monitoring occasion should be the last PDCCH monitoring occasion before the time point t.

In some configurations, the time interval between the PDCCH monitoring occasion (the PDCCH including the DCI carrying the PEI information) and the paging occasion indicated by the indication information, or the time interval between the radio frame where the PDCCH monitoring occasion (the PDCCH including the DCI carrying the PEI information) is located and the paging occasion indicated by the indication information, or the time interval between the PDCCH monitoring occasion (the PDCCH including the DCI carrying the PEI information) and the first paging occasion indicated by the indication information, or the time interval between the radio frame where the PDCCH monitoring occasion (the PDCCH including the DCI carrying the PEI information) is located and the radio frame where the paging occasion indicated by the indication information is located, may not be a fixed value, and may vary as the PDCCH monitoring occasion (the PDCCH including the DCI carrying the PEI information) changes. For example, the distribution of POs in different time periods may not be uniform due to uplink-downlink configurations in a Time Division Duplex (TDD) system. In this case, the minimum time interval can be used as a constraint, that is, the time interval between the PDCCH monitoring occasion (the PDCCH including the DCI carrying the PEI information) and the paging occasion indicated by the indication information, the time interval between the radio frame where the PDCCH monitoring occasion (the PDCCH including the DCI carrying the PEI information) is located and the paging occasion indicated by the indication information, or the time interval between the PDCCH monitoring occasion (the PDCCH including the DCI carrying the PEI information) and the first paging occasion indicated by the indication information, or the time interval between the radio frame where the PDCCH monitoring occasion (the PDCCH including the DCI carrying the PEI information) is located and the radio frame where the paging occasion indicated by the indication information is located, is not smaller than the minimum time interval. The minimum time interval may be configured by a network device, or may be predefined. In this case, the terminal device can confirm the PDCCH monitoring occasion based on the PO time position at which the paging message is received and the minimum time interval. Generally, a time point t can be obtained as a time point that is the minimum time interval earlier than the start time position of the PO, and the PDCCH (carrying the PEI information of the terminal device) monitoring occasion should be the last PDCCH monitoring occasion before the time point t. It should be noted that in the NR system, the PDCCH monitoring occasion for scheduling system information is located in type0 PDCCH search space, and due to the beam scanning requirements, a plurality of PDCCH monitoring occasions may be included in each type0 PDCCH search space period. In this case, the terminal device may determine the PDCCH monitoring occasion based on one of the following criteria: 1) the determined PDCCH monitoring occasion is the last PDCCH monitoring occasion before the time point t (possibly including only part of the PDCCH monitoring occasions in one type0 PDCCH search space period); 2) the determined PDCCH monitoring occasion is the PDCCH monitoring occasion in the type0

PDCCH search space period that is the last type0 PDCCH search space period including all PDCCH monitoring occasions before the time point t.

Figures 8, 9, 10, 11:
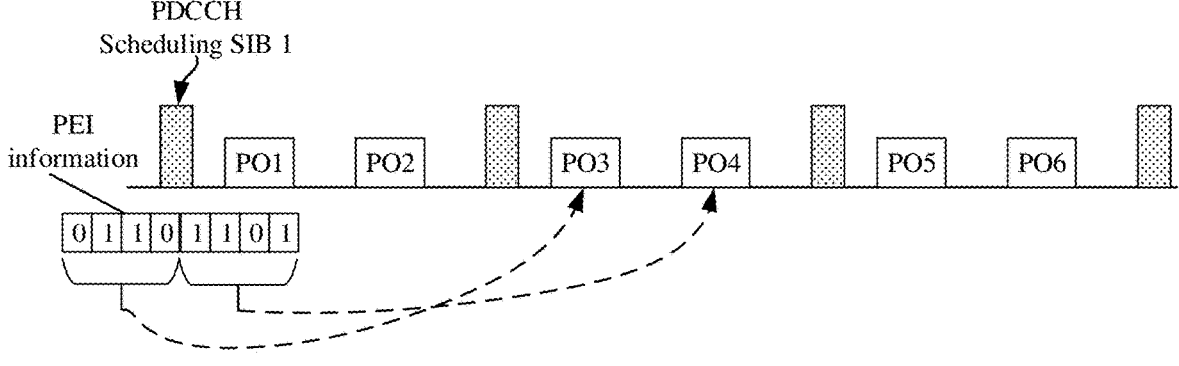
FIG. 8 is a schematic diagram showing a correspondence between PDCCHs carrying PEI information and POs according to an embodiment of the present disclosure.
FIG. 9 is a schematic diagram showing another correspondence between PDCCHs carrying PEI information and POs according to an embodiment of the present disclosure.
FIG. 10 is a schematic diagram showing yet another correspondence between PDCCHs carrying PEI information and POs according to an embodiment of the present disclosure.
FIG. 11 is a schematic diagram showing PEI information according to an embodiment of the present disclosure.
Figure 16:
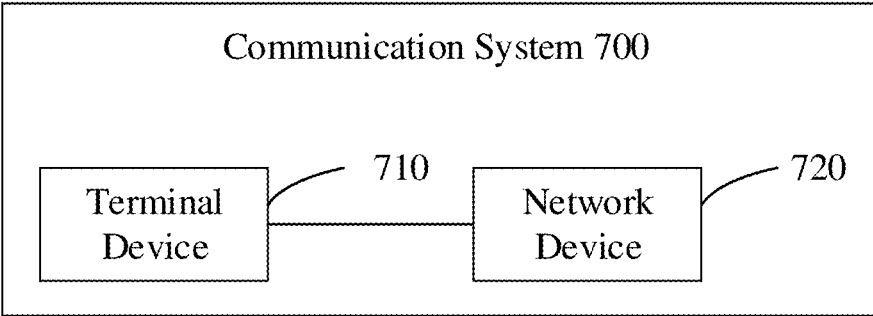
FIG. 16 is a schematic block diagram of a communication system according to an embodiment of the present disclosure.

For example, as shown in FIG. 8, a minimum time interval needs to be satisfied between the PDCCH monitoring occasion (the PDCCH including the DCI carrying the PEI information) and the paging occasion (PO) indicated by the PEI information. Therefore, for PO5, its corresponding PDCCH monitoring occasion is located at PDCCH1 in FIG. 8; and for PO6, its corresponding PDCCH monitoring occasion is located at PDCCH 2 in FIG. 8.

In another example, as shown in FIG. 9, a minimum time interval needs to be satisfied between the PDCCH monitoring occasion (the PDCCH including the DCI carrying the PEI information) and the paging occasion (PO) indicated by the PEI information. Therefore, for PO5, its corresponding PDCCH monitoring occasion is located at PDCCH1 in FIG. 9; and for PO6, its corresponding PDCCH monitoring occasion is located at PDCCH2 in FIG. 9.

When each type0 PDCCH search space period includes a plurality of PDCCH monitoring occasions, as shown in FIG. 10, each type0 PDCCH search space period will include 2 PDCCH monitoring occasions. For PO5, when the above first criterion is used, a time point t can be obtained as a time point that is the minimum time interval earlier than the start time position of PO5, and the PDCCH (carrying the PEI information of the terminal device) monitoring occasion should be the last PDCCH monitoring occasion before the time point t. That is, the determined PDCCH monitoring occasion is PDCCH 2-1 in the corresponding PDCCH 2. When the second criterion is used, a time point t can be obtained as a time point that is the minimum time interval earlier than the start time position of PO5, and the PDCCH (carrying the PEI information of the terminal device) monitoring occasion should be the PDCCH monitoring occasion in the type0 PDCCH search space period that is the last type0 PDCCH search space period including two PDCCH monitoring occasions before the time point t, that is, the determined PDCCH monitoring occasion is PDCCH 1-1 and PDCCH 1-2 in the corresponding PDCCH 1.

Therefore, the determined PDCCH (carrying the PEI information) monitoring occasion and the paging occasion (PO) satisfy a certain time interval or minimum time interval, such that the terminal device can receive enough SSBs within the certain time interval or minimum time interval when it needs to receive the paging message, so as to achieve time-frequency synchronization.

Optionally, the number of paging occasions corresponding to the PDCCH may be determined according to the period of the PDCCH.

For example, a PDCCH carrying PEI information may correspond to 2 POs. This number can also be determined based on the period of the PDCCH. For example, the period of the PDCCH for scheduling SIB1 is 20 ms, then one PDCCH scheduling SIB1 and carrying PEI may correspond to the number of POs included within 20 ms.

It should be noted that when the multiplexing pattern of the Synchronization Signal Block (SSB) and the Control Resource Set (CORESET) 0 is Pattern 1 (that is, the SSB and the CORESET0 are time-division multiplexed), the period of the search space of the PDCCH for scheduling the System Information Block (SIB) is 2 radio frames, that is, 20 ms. When the multiplexing pattern of the SSB and the CORESET0 is Pattern 2 or 3 (that is, the SSB and the CORESET0 are frequency-division multiplexed), the period of the search space of the PDCCH for scheduling the SIB is equal to the period of the SSB, which is 5 ms, 10 ms, 20 ms . . . 160 ms, while the SSB period for initial access to a cell is typically 20 ms. Therefore, based on the multiplexing pattern of the SSB and the CORESET0, the period of the search space of the PDCCH for scheduling system information may be different. On the other hand, the number of paging occasions corresponding to a PDCCH for scheduling system information may also vary due to the configuration of paging occasions. For example, if the PDCCH monitoring time configured in the search space of the PDCCCH for scheduling the paging message is distributed densely in the time domain, then the number of paging occasions corresponding to the PDCCH will be relatively large. On the other hand, if the PDCCH monitoring time configured in the PDCCCH search space for scheduling the paging message is distributed sparsely in the time domain, the number of paging occasions corresponding to the PDCCH will be relatively small. Furthermore, in the NR TDD system, the numbers of paging occasions corresponding to PDCCHs having different PDCCH periods for scheduling system information may also be different, since within different PDCCH periods for scheduling system information, the TDD uplink-downlink configurations may be different in different PDCCH periods for scheduling system information, resulting in different numbers of POs actually distributed in different PDCCH periods for scheduling system information.

In an optional implementation, the indication information may occupy N groups of bits, and each of the N groups of bits includes M bits, where N and M are positive integers. Here, each of the N groups of bits corresponds to a paging occasion, and each of the M bits corresponds to a terminal group. That is, the indication information corresponds to M terminal groups.

Optionally, a bit value of each bit occupied by the indication information may indicate whether the terminals in the corresponding terminal group monitor the paging message at the corresponding paging occasion. For example, a bit value of 0 may indicate that terminals in the corresponding terminal group monitor the paging message at the corresponding paging occasion, and a bit value of 1 may indicate that terminals in the corresponding terminal group do not monitor the paging message at the corresponding paging occasion, or vice versa.

For example, as shown in FIG. 11, the indication information (such as PEI information) is carried in the DCI for scheduling SIB 1. The DCI is carried by the PDCCH. The PEI information occupies 8 bits in total, among which the first 4 bits correspond to PO3 and indicate whether the terminals in the terminal group receive the paging message at PO3, and the last 4 bits correspond to PO4 and indicate whether the terminals in the terminal group receive the paging message at PO4. Each of the first/last 4 bits corresponds to the 4 terminal groups at the corresponding PO, denoted as: Terminal Group 1, Terminal Group 2, Terminal Group 3, and Terminal Group 4, respectively.

Optionally, the correspondence satisfied by the bits occupied by the indication information may be pre-configured, or agreed in a protocol. Alternatively, the correspondence satisfied by the bits occupied by the indication information may be configured by a network device via RRC signaling or broadcast signaling. That is, the paging occasion corresponding to each of the N groups of bits, and the terminal group corresponding to each of the M bits can be pre-configured, or agreed in a protocol, or can be configured by a network device via RRC signaling or broadcast signaling.

Optionally, in some embodiments, the number of terminal groups corresponding to the indication information may be pre-configured, or agreed in a protocol, or the number of terminal groups corresponding to the indication information may be configured or indicated by a network device via higher layer signaling.

Here, the higher layer signaling may be system information, such as SIBx, or dedicated RRC signaling.

Optionally, in some embodiments, an order of bits corresponding to respective terminal groups may be determined according to identifiers of the terminal groups. For example, the order of bits corresponding to the respective terminal groups may be arranged according to an ascending order or a descending order of the identifiers of the terminal groups.

Optionally, in some embodiments, an order of bits corresponding to respective terminal groups may be determined according to time domain positions of paging occasions corresponding to the indication information. For example, when the indication information (such as PEI information) corresponds to S POs, the bits of the respective terminal groups corresponding to the POs may be arranged in a chronological order or a reverse chronological order of the time positions of the POs.

In some embodiments, the terminal group may be divided by:

determining an index of the terminal group based on identifiers of terminals; or determining an index of the terminal group based on access classes of terminals.

For example, the index of the terminal group may be determined as the terminal identifier (UE ID) modulo X, where X is the total number of groups.

In another example, the index of the terminal group may be determined as a result of applying a first process on the terminal identification (UE ID) or the result modulo X, where X is the total number of groups. Here, the first process may be dividing the terminal identification (UE ID) by Y, or a rounded-down result of dividing the terminal identification (UE ID) by Y, where Y is the number of POs in a paging cycle.

In another example, the terminal group may be divided based on access classes of terminals. For example, an access class may have a one-to-one correspondence to an index of the terminal group.

Therefore, in the embodiment of the present disclosure, the terminal device can determine the number of terminal groups in the indication information (such as PEI information), thereby determining the identifier of the terminal group to which the terminal device belongs, and determining whether to monitor the paging message based on the indication information. That is, When the terminal device does not need to receive the paging message, it avoids monitoring the paging message at the position of the paging occasion, so as to achieve power saving of the terminal.

Furthermore, the terminal or the network can flexibly determine the number of terminal groups corresponding to the indication information (such as PEI information) based on factors such as the period for transmitting the indication information (such as PEI information), the number of available bits in the indication information (such as PEI information), and the number of paging occasions corresponding to the indication information (such as PEI information). On one hand, the available bits can be fully utilized, and on the other hand, all paging occasions can have corresponding indication bits. When there are many available bits corresponding to one paging occasion, a larger number of terminal groups can be set, so as to provide finer terminal grouping indication and achieve a better power saving effect of the terminal.

The method embodiments of the present disclosure have been described in detail above with reference to FIGS. 5-11, and the apparatus embodiments of the present disclosure will be described in detail below with reference to FIGS. 12-16. It should be understood that the apparatus embodiments and the method embodiments correspond to each other, and for similar descriptions, reference can be made to the method embodiments.

FIG. 12 shows a schematic block diagram of a terminal device 300 according to an embodiment of the present disclosure. As shown in FIG. 12, the terminal device 300 includes:

a communication unit 310 configured to receive indication information corresponding to at least one terminal group and indicating whether terminals in the corresponding terminal group monitor a paging message.

Optionally, a number of terminal groups corresponding to the indication information may be determined according to at least one of:

a period for transmitting the indication information, a number of available bits in the indication information, or a number of paging occasions corresponding to the indication information.

Optionally, the indication information may occupy N groups of bits, and each of the N groups of bits includes M bits, where N and M are positive integers, each of the N groups of bits corresponding to a paging occasion, and each of the M bits corresponding to a terminal group.

Optionally, a bit value of each bit occupied by the indication information may indicate whether the terminals in the corresponding terminal group monitor the paging message at the corresponding paging occasion.

Optionally, the indication information may be carried in Downlink Control Information (DCI), and the number of available bits in the indication information may be equal to a number of reserved bits in the DCI, or the number of available bits in the indication information may be equal to a number of bits that are a part of the reserved bits in the DCI, or the number of available bits in the indication information may be equal to a number of reserved bits in the DCI other than a first bit, or the number of available bits in the indication information may be equal to a number of bits that are a part of the reserved bits in the DCI other than the first bit.

Optionally, the part of the reserved bits may be pre-configured, or agreed in a protocol, or the part of the reserved bits may be configured by a network device.

Optionally, the first bit may indicate an available reference signal.

Optionally, the available reference signal may be used for time-frequency synchronization and/or Radio Resource Management (RRM) measurement of the terminal device when receiving the paging message.

Optionally, the available reference signal may include an available reference signal out of a plurality of reference signals, and configuration information for the plurality of reference signals may be configured by a network device via system information or Radio Resource Control (RRC) signaling.

Optionally, a number of bits included in the first bit may be pre-configured, or agreed in a protocol, or the number of bits included in the first bit may be configured by a network device, or the number of bits included in the first bit may be determined based on configuration information for a plurality of reference signals and the available reference signal may include an available reference signal out of the plurality of reference signals.

Optionally, the number of terminal groups corresponding to the indication information may be equal to a number of available bits in the indication information.

Optionally, when the indication information corresponds to one paging occasion, the number of terminal groups corresponding to the indication information may be equal to the number of available bits in the indication information.

Optionally, when the indication information corresponds to Q paging occasions, the number of terminal groups corresponding to the indication information may be equal to a rounded-down result of the number of available bits in the indication information divided by Q, where Q is a positive integer; or when the indication information corresponds to Q paging occasions, the number of terminal groups corresponding to the indication information may be equal to a result of the number of available bits in the indication information divided by Q.

Optionally, a number of terminal groups corresponding to the indication information may be pre-configured, or agreed in a protocol, or the number of terminal groups corresponding to the indication information may be configured or indicated by a network device via higher layer signaling.

Optionally, an order of bits corresponding to respective terminal groups may be determined according to identifiers of the terminal groups; or an order of bits corresponding to respective terminal groups may be determined according to time domain positions of paging occasions corresponding to the indication information.

Optionally, the terminal group may be:

determined based on identifiers of terminals; or determined based on access classes of terminals.

Optionally, the indication information may be carried DCI for scheduling system information.

Optionally, the indication information may occupy part or all of reserved bits in the DCI.

Optionally, the reserved bits are not used for scheduling the system information.

Optionally, the indication information may be Paging Early Indication (PEI) information.

Optionally, the terminal device may be in an idle state or an inactive state.

Optionally, in some embodiments, the above communication unit may be a communication interface or a transceiver, or an input/output interface of a communication chip or a system-on-chip.

It should be understood that the terminal device 300 according to the embodiment of the present disclosure may correspond to the terminal device in the method embodiment of the present disclosure, and the above and other operations and/or functions of the respective units in the terminal device 300 are provided for the purpose of implementing the process flow corresponding to the terminal device in the method 200 shown in FIG. 5, and details thereof will be not omitted here for brevity.

FIG. 13 shows a schematic block diagram of a network device 400 according to an embodiment of the present disclosure. As shown in FIG. 13, the network device 400 includes:

a communication unit 410 configured to transmit indication information corresponding to at least one terminal group and indicating whether terminals in the corresponding terminal group monitor a paging message.

Optionally, a number of terminal groups corresponding to the indication information may be determined according to at least one of:

a period for transmitting the indication information, a number of available bits in the indication information, or a number of paging occasions corresponding to the indication information.

Optionally, the indication information may occupy N groups of bits, and each of the N groups of bits includes M bits, where N and M are positive integers, each of the N groups of bits corresponding to a paging occasion, and each of the M bits corresponding to a terminal group.

Optionally, a bit value of each bit occupied by the indication information indicates whether the terminals in the corresponding terminal group monitor the paging message at the corresponding paging occasion.

Optionally, the indication information may be carried in Downlink Control Information (DCI), and the number of available bits in the indication information may be equal to a number of reserved bits in the DCI, or the number of available bits in the indication information may be equal to a number of bits that are a part of the reserved bits in the DCI, or the number of available bits in the indication information may be equal to a number of reserved bits in the DCI other than a first bit, or the number of available bits in the indication information may be equal to a number of bits that are a part of the reserved bits in the DCI other than the first bit.

Optionally, the part of the reserved bits may be pre-configured, or agreed in a protocol, or the part of the reserved bits is configured by a network device.

Optionally, the first bit may indicate an available reference signal.

Optionally, the available reference signal may be used for time-frequency synchronization and/or Radio Resource Management (RRM) measurement of the terminal device when receiving the paging message.

Optionally, the available reference signal may include an available reference signal out of a plurality of reference signals, and configuration information for the plurality of reference signals may be configured by the network device via system information or Radio Resource Control (RRC) signaling configuration.

Optionally, a number of bits included in the first bit may be pre-configured, or agreed in a protocol, or the number of bits included in the first bit may be configured by the network device, or the number of bits included in the first bit may be determined based on configuration information for a plurality of reference signals and the available reference signal may include an available reference signal out of the plurality of reference signals.

Optionally, the number of terminal groups corresponding to the indication information may be equal to a number of available bits in the indication information.

Optionally, when the indication information corresponds to one paging occasion, the number of terminal groups corresponding to the indication information may be equal to the number of available bits in the indication information.

Optionally, when the indication information corresponds to Q paging occasions, the number of terminal groups corresponding to the indication information may be equal to a rounded-down result of the number of available bits in the indication information divided by Q, where Q is a positive integer; or when the indication information corresponds to Q paging occasions, the number of terminal groups corresponding to the indication information may be equal to a result of the number of available bits in the indication information divided by Q.

Optionally, a number of terminal groups corresponding to the indication information may be pre-configured, or agreed in a protocol, or the number of terminal groups corresponding to the indication information may be configured or indicated by the network device via higher layer signaling.

Optionally, an order of bits corresponding to respective terminal groups may be determined according to identifiers of the terminal groups; or an order of bits corresponding to respective terminal groups may be determined according to time domain positions of paging occasions corresponding to the indication information.

Optionally, the terminal group may be:

determined based on identifiers of terminals; or determined based on access classes of terminals.

Optionally, the indication information may be carried in the DCI for scheduling system information.

Optionally, the indication information may occupy part or all of reserved bits in the DCI.

Optionally, the reserved bits are not used for scheduling the system information.

Optionally, the indication information may be Paging Early Indication (PEI) information.

Optionally, in some embodiments, the above communication unit may be a communication interface or a transceiver, or an input/output interface of a communication chip or a system-on-chip. The above processing unit may be one or more processors.

It should be understood that the network device 400 according to the embodiment of the present disclosure may correspond to the network device in the method embodiment of the present disclosure, and the above and other operations and/or functions of the respective units in the network device 400 are provided for the purpose of implementing the process flow corresponding to the network device in the method 200 shown in FIG. 5, and details thereof will be not omitted here for brevity.

FIG. 14 is a schematic diagram showing a structure of a communication device 500 according to an embodiment of the present disclosure. The communication device 500 shown in FIG. 14 includes a processor 510, and the processor 510 can invoke and execute a computer program from a memory to implement the method in the embodiment of the present disclosure.

Optionally, as shown in FIG. 14, the communication device 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

Optionally, as shown in FIG. 14, the communication device 500 may further include a transceiver 530, and the processor 510 may control the transceiver 530 to communicate with other devices, and in particular, transmit information or data to other devices, or receive information or data transmitted by other devices.

Here, the transceiver 530 may include a transmitter and a receiver. The transceiver 530 may further include one or more antennas.

Optionally, the communication device 500 may specifically be the network device according to the embodiment of the present disclosure, and the communication device 500 may implement the corresponding processes implemented by the network device in any of the methods according to the embodiments of the present disclosure. For the sake of brevity, details thereof will be omitted here.

Optionally, the communication device 800 may specifically be the terminal device according to the embodiment of the present disclosure, and the communication device 500 may implement the corresponding processes implemented by the terminal device in any of the methods according to the embodiments of the present disclosure. For the sake of brevity, details thereof will be omitted here.

FIG. 15 is a schematic diagram showing a structure of an apparatus according to an embodiment of the present disclosure. The apparatus 600 shown in FIG. 15 includes a processor 610, and the processor 610 can invoke and execute a computer program from a memory to implement the method in the embodiment of the present disclosure.

Optionally, as shown in FIG. 15, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the apparatus 600 may further include an input interface 630. The processor 610 can control the input interface 630 to communicate with other devices or chips, and in particular, obtain information or data transmitted by other devices or chips.

Optionally, the apparatus 600 may further include an output interface 640. The processor 610 can control the output interface 640 to communicate with other devices or chips, and in particular, output information or data to other devices or chips.

Optionally, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

Optionally, the apparatus can be applied to the terminal device in the embodiment of the present disclosure, and the apparatus can implement the corresponding processes implemented by the terminal device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

FIG. 7 is a schematic block diagram showing a communication system 700 according to an embodiment of the present disclosure. As shown in FIG. 7, the communication system 700 includes a terminal device 710 and a network device 720.

Here, the terminal device 710 can be configured to implement the corresponding functions implemented by the terminal device in the above method, and the network device 720 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A paging indicating method, comprising:
receiving, by a terminal device, indication information corresponding to at least one terminal group and indicating whether terminals in the corresponding terminal group are to monitor for a paging message;
wherein the indication information is carried in Downlink Control Information (DCI), and the number of available bits in the indication information is equal to a number of reserved bits in the DCI, or the number of available bits in the indication information is equal to a number of bits that are a part of the reserved bits in the DCI, or the number of available bits in the indication information is equal to a number of reserved bits in the DCI other than a first bit, or the number of available bits in the indication information is equal to a number of bits that are a part of the reserved bits in the DCI other than the first bit;
wherein the first bit indicates an available reference signal.

2. The method according to claim 1, wherein a number of terminal groups corresponding to the indication information is pre-configured, or agreed in a protocol, or the number of terminal groups corresponding to the indication information is configured or indicated by a network device via higher layer signaling.

3. The method according to claim 1, wherein the terminal group is:
determined based on identifiers of terminals; or
determined based on access classes of terminals.

4. The method according to claim 1, wherein the indication information is Paging Early Indication (PEI) information.

5. The method according to claim 1, wherein the terminal device is in an idle state or an inactive state.

6. The method according to claim 1, wherein the indication information is carried in a Physical Downlink Control Channel (PDCCH), and the PDCCH is a specially configured PDCCH dedicated to carrying the indication information.

7. The method according to claim 6, wherein the indication information occupies N groups of bits, and each of the N groups of bits includes M bits, where N and M are positive integers, each of the N groups of bits corresponding to one paging occasion, and each of the M bits corresponding to one terminal group.

8. The method according to claim 7, wherein a bit value of each bit occupied by the indication information indicates whether the terminals in the corresponding terminal group monitor the paging message at the corresponding paging occasion.

9. The method according to claim 1, wherein the available reference signal is used for time-frequency synchronization and/or Radio Resource Management (RRM) measurement of the terminal device when receiving the paging message.

10. The method according to claim 1, wherein the available reference signal comprises an available reference signal out of a plurality of reference signals, and configuration information for the plurality of reference signals is configured by a network device via system information or Radio Resource Control (RRC) signaling.

11. The method according to any one of claims 1, wherein a number of bits included in the first bit is pre-configured, or agreed in a protocol, or the number of bits included in the first bit is configured by a network device, or the number of bits included in the first bit is determined based on configuration information for a plurality of reference signals and the available reference signal comprises an available reference signal out of the plurality of reference signals.

12. The method according to claim 1, wherein an order of bits corresponding to respective terminal groups is determined according to identifiers of the terminal groups; or an order of bits corresponding to respective terminal groups is determined according to time domain positions of paging occasions corresponding to the indication information.

13. A paging indicating method, comprising:

transmitting, by a network device, indication information corresponding to at least one terminal group and indicating whether terminals in the corresponding terminal group are to monitor for a paging message;

wherein the indication information is carried in Downlink Control Information (DCI), and the number of available bits in the indication information is equal to a number of reserved bits in the DCI, or the number of available bits in the indication information is equal to a number of bits that are a part of the reserved bits in the DCI, or the number of available bits in the indication information is equal to a number of reserved bits in the DCI other than a first bit, or the number of available bits in the indication information is equal to a number of bits that are a part of the reserved bits in the DCI other than the first bit;

wherein the first bit indicates an available reference signal.

14. A network device, comprising a processor and a memory, wherein the memory has a computer program stored thereon, and the processor is configured to invoke and execute the computer program stored in the memory to perform the method according to claim 13.

15. The method according to claim 13, wherein the available reference signal is used for time-frequency synchronization and/or Radio Resource Management (RRM) measurement of the terminal device when receiving the paging message.

16. A terminal device, comprising a processor and a memory, wherein the memory has a computer program stored thereon, and the processor is configured to invoke and execute the computer program stored in the memory to:

receive indication information corresponding to at least one terminal group and indicating whether terminals in the corresponding terminal group are to monitor for a paging message;

wherein the indication information is carried in Downlink Control Information (DCI), and the number of available bits in the indication information is equal to a number of reserved bits in the DCI, or the number of available bits in the indication information is equal to a number of bits that are a part of the reserved bits in the DCI, or the number of available bits in the indication information is equal to a number of reserved bits in the DCI other than a first bit, or the number of available bits in the indication information is equal to a number of bits that are a part of the reserved bits in the DCI other than the first bit;

wherein the first bit indicates an available reference signal.

17. The terminal device according to claim 16, wherein a number of terminal groups corresponding to the indication information is pre-configured, or agreed in a protocol, or the number of terminal groups corresponding to the indication information is configured or indicated by a network device via higher layer signaling.

18. The terminal device according to claim 16, wherein the terminal group is:

determined based on identifiers of terminals; or determined based on access classes of terminals.

19. The terminal device according to claim 16, wherein the indication information is Paging Early Indication (PEI) information.

20. The terminal device according to claim 16, wherein the terminal device is in an idle state or an inactive state.

* * * * *